United States Patent
Ko

(10) Patent No.: US 7,024,694 B1
(45) Date of Patent: Apr. 4, 2006

(54) METHOD AND APPARATUS FOR CONTENT-BASED INSTRUSION DETECTION USING AN AGILE KERNEL-BASED AUDITOR

(75) Inventor: Cheuk W. Ko, San Jose, CA (US)

(73) Assignee: McAfee, Inc., Santa Clara, CA (US)

( * ) Notice: Subject to any disclaimer, the term of this patent is extended or adjusted under 35 U.S.C. 154(b) by 1369 days.

(21) Appl. No.: 09/593,280

(22) Filed: Jun. 13, 2000

(51) Int. Cl.
*G06F 11/30* (2006.01)
*G06F 12/14* (2006.01)

(52) U.S. Cl. ....................................... 726/23
(58) Field of Classification Search ................. 713/200
See application file for complete search history.

(56) References Cited

U.S. PATENT DOCUMENTS

| | | | | |
|---|---|---|---|---|
| 4,713,754 | A * | 12/1987 | Agarwal et al. | 707/100 |
| 5,278,901 | A * | 1/1994 | Shieh et al. | 713/200 |
| 5,485,409 | A * | 1/1996 | Gupta et al. | 713/200 |
| 5,513,317 | A * | 4/1996 | Borchardt et al. | 714/45 |
| 5,557,742 | A * | 9/1996 | Smaha et al. | 713/200 |
| 5,621,889 | A * | 4/1997 | Lermuzeaux et al. | 713/200 |
| 5,623,601 | A * | 4/1997 | Vu | 713/201 |
| 6,275,942 | B1 * | 8/2001 | Bernhard et al. | 713/201 |
| 6,347,374 | B1 * | 2/2002 | Drake et al. | 713/200 |
| 6,408,391 | B1 * | 6/2002 | Huff et al. | 713/201 |
| 6,584,508 | B1 * | 6/2003 | Epstein et al. | 709/229 |

OTHER PUBLICATIONS

Kernighan et al., "The UNIX Programming Environment," 1984., pp. 174, 201-217.*

Microsoft Computer Dictionary, 5th Edition, pp. 42, 166, 264, 285, 286, 300, and 343.*

* cited by examiner

*Primary Examiner*—Gregory Morse
*Assistant Examiner*—Matthew Heneghan
(74) *Attorney, Agent, or Firm*—Zilka-Kotab, PC; Christopher J. Hamaty

(57) ABSTRACT

One embodiment of the present invention provides content-based intrusion detection for a computer system by using an agile kernel-based auditing system. This auditing system operates by receiving an audit specification that specifies target attributes to be recorded during an auditing process. The audit specification also specifies an auditing criterion that triggers recording of the target attributes. Upon receiving the audit specification, the auditing system is configured to record the target attributes during system calls whenever the auditing criterion is satisfied. Next, an application program is monitored by the auditing system to produce an audit log containing the recorded target attributes. This audit log is examined in order to detect patterns for intrusion detection purposes. In one embodiment of the present invention, configuring the auditing system involves compiling the audit specification to produce a kernel module, and then loading the kernel module into a kernel of an operating system. It also involves linking code from within the kernel module into system calls within the operating system. In one embodiment of the present invention, in response to detecting an event during the auditing process, the system dynamically adjusts the auditing system to change the auditing criterion and/or the target attributes for subsequent operation of the auditing system.

27 Claims, 3 Drawing Sheets

METHOD AND APPARATUS FOR CONTENT-BASED INSTRUSION DETECTION USING AN AGILE KERNEL-BASED AUDITOR

GOVERNMENT LICENSE RIGHTS

This invention was made with United States Government support under contract #F30602-96-C-0333 funded by the Defense Advanced Research Projects Agency (DARPA) through Rome Labs. The United States Government has certain rights in the invention.

BACKGROUND

1. Field of the Invention

The present invention relates computer security and intrusion detection systems. More specifically, the present invention relates to a method and an apparatus for providing content-based intrusion detection using an agile kernel-based auditor.

2. Related Art

As computers become increasingly more interconnected, it is becoming progressively harder to safeguard computer systems from attacks launched across computer networks. Several types of attacks, such as buffer overflow attacks, and attacks that make unauthorized modifications to data objects, can be detected by examining data that is being read to and/or written from security critical files or network connections.

Unfortunately, existing intrusion detection systems cannot reliably detect these types of attacks because they do not possess the ability to examine data that is being read or written during system calls.

For example, an existing auditing system may record system call parameters or attributes of subjects and objects involved in the system calls. However, existing auditing systems do not record data that is being read from or written to files or network connections because the volume of data that is read or written is prohibitively large.

Some network sniffers can collect data being read from and/or written to files across a network. However, network sniffers cannot gather information regarding accesses to local files. Furthermore, network sniffers can suffer performance and packet-loss problems if they try to collect this type of data because as mentioned previously the volume is prohibitively large. Also, encryption is increasingly being used to protect the privacy of data transmitted across networks. Consequently, network sniffers will eventually be unable to obtain useful audit data.

Hence, what is needed is a method and apparatus for monitoring systems calls that gathers read and/or write data for intrusion detection purposes without encountering problems in handling large volumes of data.

Another problem is that existing auditing systems are not configured to collect information for specific intrusion detection systems. Existing auditing systems are typically developed by operating system developers, who do not necessarily know what types of data are required by intrusion detection systems.

Consequently, existing auditing systems are not configured to gather parameters and/or other attributes that are required by an intrusion detection system. Furthermore, an intrusion detection system may require different types of data to be gathered at different times.

Hence, what is needed is a method and an apparatus that can be configured to selectively gather specific system call information for an intrusion detection system.

SUMMARY

One embodiment of the present invention provides content-based intrusion detection for a computer system by using an agile kernel-based auditing system. This auditing system operates by receiving an audit specification that specifies target attributes to be recorded during an auditing process. The audit specification also specifies an auditing criterion that triggers recording of the target attributes. Upon receiving the audit specification, the auditing system is configured to record the target attributes during system calls whenever the auditing criterion is satisfied. Next, an application program is monitored by the auditing system to produce an audit log containing the recorded target attributes. This audit log is examined in order to detect patterns for intrusion detection purposes.

In one embodiment of the present invention, configuring the auditing system involves compiling the audit specification to produce a kernel module, and then loading the kernel module into a kernel of an operating system. It also involves linking code from within the kernel module into system calls within the operating system.

In one embodiment of the present invention, in response to detecting an event during the auditing process, the system dynamically adjusts the auditing system to change the auditing criterion and/or the target attributes for subsequent operation of the auditing system.

In one embodiment of the present invention, the auditing system is configured to modify a system call jump table to cause selected system calls to execute code that causes the target attributes to be recorded in response to the auditing criterion being satisfied.

In one embodiment of the present invention, the target attributes can include: an argument from a system call; a parameter of a process making the system call; data read during the system call; data written during the system call; a parameter of a file involved in the system call; and a parameter relating to a network communication involved in the system call.

In one embodiment of the present invention, the auditing criterion can include: a user identifier for a process that is making a system call; an identifier for an application program from which the system call is being made; and an identifier for a file being accessed by the system call.

In one embodiment of the present invention, producing the audit log involves filtering the target attributes to reduce an amount of data stored in the audit log.

In one embodiment of the present invention, producing the audit log involves determining a characteristic of a target attribute, and recording the characteristic in the audit log.

In one embodiment of the present invention, the audit specification is received from either a user of the auditing system, or an intrusion detection mechanism.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital video discs), and computer instruction signals embodied in a transmission medium (with or without a carrier wave upon which the signals are modulated). For example, the transmission medium may include a communications network, such as the Internet.

Computer System

Figure 1:
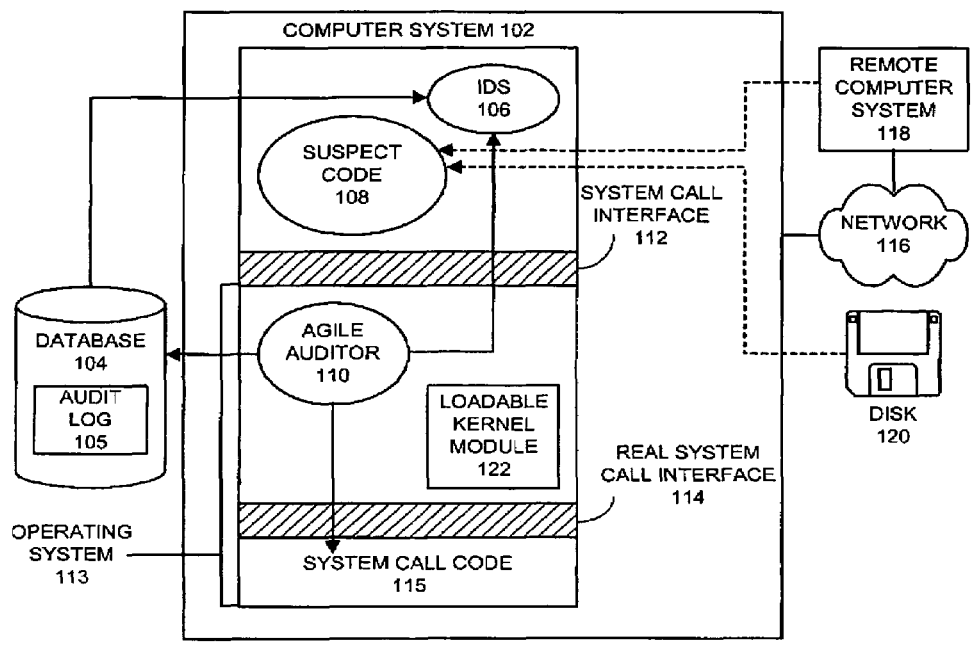
FIG. 1 illustrates a computer system in accordance with an embodiment of the present invention.

FIG. 1 illustrates a computer system 102 in accordance with an embodiment of the present invention. Computer system 102 can generally include any type of computer system, including, but not limited to, a computer system based on a microprocessor, a mainframe computer, a digital signal processor, a personal organizer, a device controller, and a computational engine within an appliance.

Computer system 102 is coupled to database 104. Database 104 can generally include any type of system for storing data in non-volatile storage. This includes, but is not limited to, systems based upon magnetic, optical, and magneto-optical storage devices, as well as storage devices based on flash memory and/or battery-backed up memory. Database 104 contains audit log 105 for recording auditing information for intrusion detection purposes in accordance with an embodiment of the present invention.

Computer system 102 is also coupled to remote computer system 118 through network 116. Network 116 can include any type of wire or wireless communication channel capable of coupling together computing nodes. This includes, but is not limited to, a local area network, a wide area network, or a combination of networks. In one embodiment of the present invention, network 116 includes the Internet.

Remote computer system 118 can include any entity that is capable of transmitting suspect code 108 across network 116 into computer system 102.

Suspect code 108 may additionally be introduced into computer system 102 by encoding suspect code 108 on a computer-readable storage medium, such as disk 120, and introducing disk 120 into computer system 102. Note that disk 120 can generally include any type of computer-readable storage medium, such as a magnetic disk, a magnetic tape and a CD-ROM.

Also note that suspect code 108 may also be introduced into computer system 102 through other communications mechanisms.

During operation, computer system 102 executes suspect code 108 as well as intrusion detection system (IDS) 106. During execution, suspect code 108 makes a number of system calls through system call interface 112. These system calls are intercepted by agile auditor 110, which causes target attributes from the system calls to be recorded within audit log 105 upon detection of an auditing criterion.

Agile auditor 110 can generally include any type of mechanism for auditing system calls generated by suspect code 108. Note that agile auditor 110 makes use of loadable kernel module 122, which contains code that records specified attributes for specific system calls upon the occurrence of specific auditing criteria.

Agile auditor 110 in turn makes system calls through real system call interface 114 to access system call code 115. Note that real system call interface 114 is a pre-existing system call interface for operating system 113. Agile auditor 110 and system call interface 112 are layered on top of real system call interface 114 in order to intercept system calls generated by suspect code 108.

Process of Configuring Auditing System

Figure 2:
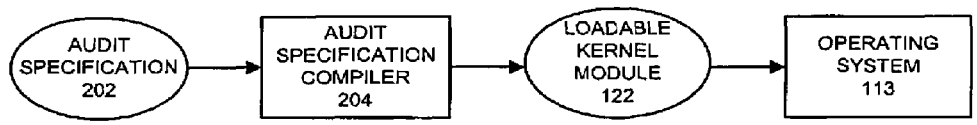
FIG. 2 illustrates the process if configuring an auditing system in accordance with an embodiment of the present invention.

FIG. 2 illustrates the process if configuring an auditing system in accordance with an embodiment of the present invention. The system starts with an audit specification 202 that specifies specific attributes to be recorded for specific system calls upon the occurrence of specific auditing criteria.

Audit specification 202 feeds through a special audit specification compiler 204, which converts audit specification 202 into auditing code to implement audit specification. This auditing code is packaged into a loadable kernel module 122, which is loaded into operating system 113 within computer system 102.

System Call Jump Table

Figure 3:
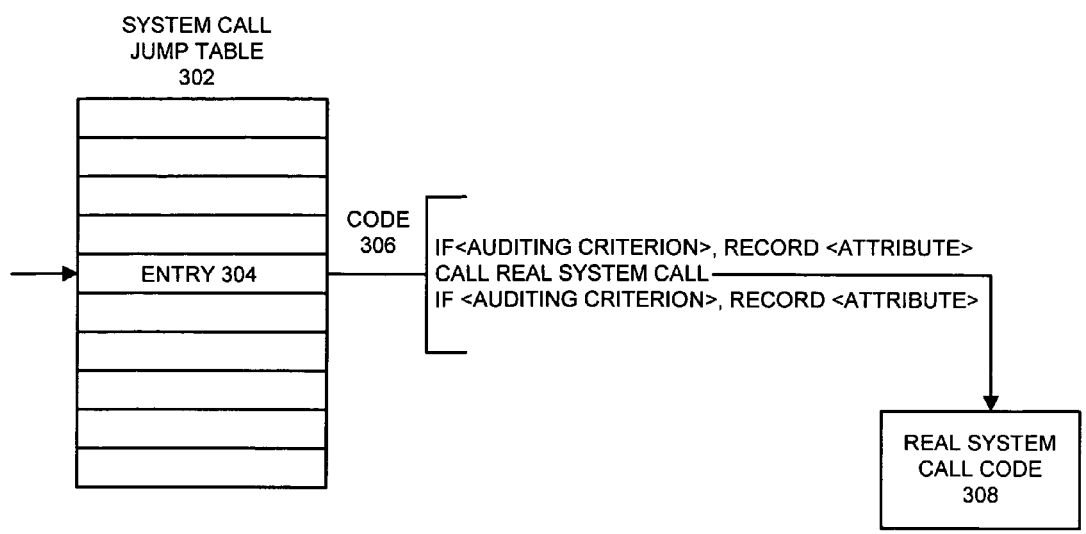
FIG. 3 illustrates how a system call jump table is modified in accordance with an embodiment of the present invention.

FIG. 3 illustrates how system call jump table 302 is modified in accordance with an embodiment of the present invention. System call jump table 302 includes a number of entries that specify the location of corresponding system call functions. For example, entry 304 within system call jump table 302 would normally point to real system call code 308. However, during the process of linking loadable kernel module 122 into operating system 113, entry 304 is modified to point to code 306 within loadable kernel module 122.

Code 306 first records a target attribute if a specific auditing criterion is satisfied. For example, upon detecting a write to a password file, code 306 may record all data that is written to the password file.

Note that the target attribute can generally include any information related to the system call, including an argument of the system call, a parameter related to a process making the system call (such as a process ID, an effective user ID, a user ID, a group ID, an effective group ID, a parent process ID, a session ID and a pathname for the process), data read during the system call, data written during the system call, a parameter related to a file involved in the system call (such as a permission mode, an inode number, a device ID, a time of creation, an owner user ID and a file type) or a parameter related to a network communication involved in the system call (such as an IP address or port number).

Also note that the auditing criterion can generally include any specifier for a condition associated with a system call, including a user identifier for a process that is making the system call, an identifier for an application program from which the system call is being made or an identifier for a file being accessed by the system call. Note that the condition is satisfied if a currently used identifier matches the specified identifier. For example, if the identifier specifies a password file, if the password file is being currently accessed, the condition is satisfied.

Next code 306 calls the real underlying system call through real system call interface 114.

After the real system call returns, code 306 can record another target attribute in response to detecting another auditing criterion. This capability is useful for recording the result of the real system call.

Process of Configuring and Running Auditing System

Figure 4:
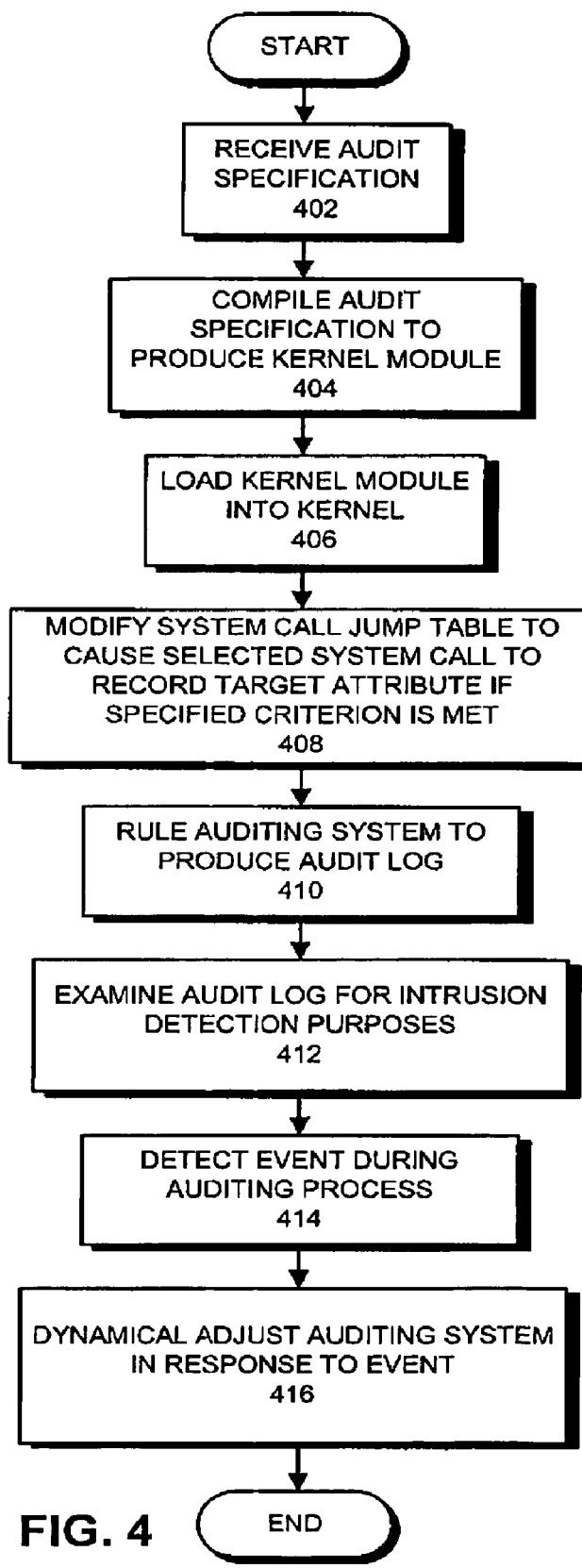
FIG. 4 is a flow chart illustrating the process of configuring and running the auditing system in accordance with an embodiment of the present invention.

FIG. 4 is a flow chart illustrating the process of configuring and running the auditing system in accordance with an embodiment of the present invention. The system starts by receiving audit specification 202 (step 402). In one embodiment of the present invention, audit specification 202 is received from either a human user of the auditing system, or from an intrusion detection mechanism that automatically generates audit specification 202.

Audit specification 202 is compiled using audit specification compiler 204 to produce loadable kernel module 122 (step 404). Next, loadable kernel module 122 is inserted into the kernel of operating system 113 (step 406).

This loading process involves modifying system call jump table 302 (from FIG. 3) so that code 306 is accessed during a reference to a specified system call (step 408). This causes the specified system call to record the target attribute if a specified auditing criterion is satisfied.

Next, suspect code 108 is executed. This causes agile auditor 110 to record specified target attributes during specified system calls to audit log 105 (step 410). Note that producing audit log 105 can involve filtering the target attribute to reduce an amount of data stored in audit log 105. This filtering may also involve determining a characteristic of the target attribute and storing the characteristic instead of the target attribute. For example, the auditing system may determine that data read during a system call is binary executable code. In this case, the characteristic "binary" can then be stored in audit log 105 instead of storing the binary executable code itself.

Next, the system examines audit log 105 for intrusion detection purposes (step 412). Note that in general any type of intrusion detection mechanism can be used with the present invention. Hence, the details of the intrusion detection mechanism will not be discussed further in this specification.

Also note that the present invention can be dynamically configured to gather specific information for specific intrusion detection mechanisms. Upon detecting an event during the auditing process (step 414), the system can dynamically adjust itself in response to the event (step 416). For example, upon detecting retrieval of data from a remote server, the system can record all reads and writes involving the process that retrieved the data.

Note that by selectively recording target attributes, the present invention can reduce the amount of data that is recorded during the auditing process. This makes it practical to record data that is read or written during system calls without overwhelming the storage capacity, processing power and/or data transfer bandwidth of a computer system.

The foregoing descriptions of embodiments of the invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for providing content-based intrusion detection for a computer system by using an agile kernel-based auditing system, comprising:
   receiving an audit specification;
   wherein the audit specification specifies at least one target attribute to be recorded from a set of possible target attributes during an auditing process by the auditing system;
   wherein the audit specification also specifies at least one auditing criterion that triggers recording of the at least one target attribute during the auditing process;
   configuring the auditing system to record the at least one target attribute in response to detecting the at least one auditing criterion;
   running the auditing system to produce an audit log by recording the at least one target attribute in response to detecting the at least one auditing criterion; and
   examining the audit log to detect patterns for intrusion detection purposes;
   wherein a size of the audit log is reduced when the auditing system is run prior to the examination for detection of the patterns.

2. The method of claim 1, further comprising:
   detecting an event during the auditing process; and
   in response to detecting the event, dynamically adjusting the auditing system during the auditing process to change the at least one auditing criterion and/or the at least one target attribute for subsequent operation of the auditing system.

3. The method of claim 1, wherein the auditing system is configured to modify a system call jump table to cause at least one selected system call to execute code that causes the at least one target attribute to be recorded in response to detecting the at least one auditing criterion.

4. The method of claim 1, wherein the at least one target attribute includes:
   an argument from a system call;
   a parameter of a process making the system call;
   data read during the system call;
   data written during the system call;
   a parameter of a file involved in the system call; and
   a parameter relating to a network communication involved in the system call.

5. The method of claim 1, wherein configuring the auditing system to record the at least one target attribute comprises:
   compiling the audit specification to produce a kernel module;
   loading the kernel module into a kernel of an operating system of the computer system; and
   linking code from within the kernel module into system calls within the operating system.

6. The method of claim 1, wherein the at least one auditing criterion includes:
   a user identifier for a process that is making a system call;
   an identifier for an application program from which the system call is being made; and
   an identifier for a file being accessed by the system call.

7. The method of claim 1, wherein producing the audit log comprises filtering the at least one target attribute to reduce an amount of data stored in the audit log.

8. The method of claim 1, wherein producing the audit log comprises:

determining at least one characteristic of the at least one target attribute; and recording the at least one characteristic in the audit log.

9. The method of claim 1, wherein the audit specification is received from one of:

a user of the auditing system; and an intrusion detection mechanism.

10. A computer-readable storage medium storing instructions that when executed by a computer cause the computer to perform a method for providing content-based intrusion detection for a computer system by using an agile kernel-based auditing system, the method comprising:

receiving an audit specification;

wherein the audit specification specifies at least one target attribute to be recorded from a set of possible target attributes during an auditing process by the auditing system;

wherein the audit specification also specifies at least one auditing criterion that triggers recording of the at least one target attribute during the auditing process;

configuring the auditing system to record the at least one target attribute in response to detecting the at least one auditing criterion in response to detecting the at least one auditing criterion;

running the auditing system to produce an audit log by recording the at least one target attribute; and examining the audit log to detect patterns for intrusion detection purposes;

wherein a size of the audit log is reduced when the auditing system is run prior to the examination for detection of the patterns.

11. The computer-readable storage medium of claim 10, wherein the method further comprises:

detecting an event during the auditing process; and in response to detecting the event, dynamically adjusting the auditing system during the auditing process to change the at least one auditing criterion or the at least one target attribute for subsequent operation of the auditing system.

12. The computer-readable storage medium of claim 10, wherein the auditing system is configured to modify a system call jump table to cause at least one selected system call to execute code that causes the at least one target attribute to be recorded in response to detecting the at least one auditing criterion.

13. The computer-readable storage medium of claim 10, wherein the at least one target attribute includes:

an argument from a system call;

a parameter of a process making the system call;

data read during the system call;

data written during the system call;

a parameter of a file involved in the system call; and a parameter relating to a network communication involved in the system call.

14. The computer-readable storage medium of claim 10, wherein configuring the auditing system to record the at least one target attribute comprises:

compiling the audit specification to produce a kernel module;

loading the kernel module into a kernel of an operating system of the computer system; and linking code from within the kernel module into system calls within the operating system.

15. The computer-readable storage medium of claim 10, wherein the at least one auditing criterion includes:

a user identifier for a process that is making a system call;

an identifier for an application program from which the system call is being made; and an identifier for a file being accessed by the system call.

16. The computer-readable storage medium of claim 10, wherein producing the audit log comprises filtering the at least one target attribute to reduce an amount of data stored in the audit log.

17. The computer-readable storage medium of claim 10, wherein producing the audit log comprises:

determining at least one characteristic of the at least one target attribute; and recording the at least one characteristic in the audit log.

18. The computer-readable storage medium of claim 10, wherein the audit specification is received from one of:

a user of the auditing system; and an intrusion detection mechanism.

19. A apparatus for providing content-based intrusion detection for a computer system by using an agile kernel-based auditing mechanism, comprising:

an auditing mechanism that is configured to audit system calls;

a receiving mechanism that is configured to receive an audit specification;

wherein the audit specification specifies at least one target attribute to be recorded from a set of possible target attributes during an auditing process by the auditing mechanism;

wherein the audit specification also specifies at least one auditing criterion that triggers recording of the at least one target attribute during the auditing process;

an initialization mechanism that configures the auditing mechanism to record the at least one target attribute in response to detecting the at least one auditing criterion;

wherein the auditing mechanism is configured to produce an audit log by recording the at least one target attribute in response to detecting the at least one auditing criterion; and an intrusion detection mechanism that is configured to examine the audit log to detect patterns for intrusion detection purposes;

wherein a size of the audit log is reduced when the auditing mechanism is run prior to the examination for detection of the patterns.

20. The apparatus of claim 19, wherein the initialization mechanism is further configured to:

detect an event during the auditing process; and in response to detecting the event, to dynamically adjust the auditing mechanism during the auditing process to change the at least one auditing criterion or the at least one target attribute for subsequent operation of the auditing mechanism.

21. The apparatus of claim 19, wherein the auditing mechanism is configured to modify a system call jump table to cause at least one selected system call to execute code that causes the at least one target attribute to be recorded in response to detecting the at least one auditing criterion.

22. The apparatus of claim 19, wherein the at least one target attribute includes:

an argument from a system call;

a parameter of a process making the system call;

data read during the system call;

data written during the system call;

a parameter of a file involved in the system call; and a parameter relating to a network communication involved in the system call.

23. The apparatus of claim 19, wherein the auditing mechanism is configured to:
  compile the audit specification to produce a kernel module;
  load the kernel module into a kernel of an operating system of the computer system; and to link code from within the kernel module into system calls within the operating system.

24. The apparatus of claim 19, wherein the at least one auditing criterion includes:
  a user identifier for a process that is making a system call;
  an identifier for an application program from which the system call is being made; and
  an identifier for a file being accessed by the system call.

25. The apparatus of claim 19, wherein the auditing mechanism is configured to produce the audit log by filtering the at least one target attribute to reduce an amount of data stored in the audit log.

26. The apparatus of claim 19, wherein the auditing mechanism is configured to produce the audit log by operations comprising:
  determining at least one characteristic of the at least one target attribute; and
  recording the at least one characteristic in the audit log.

27. The apparatus of claim 19, wherein the audit specification is received from one of:
  a user of the auditing mechanism; and
  the intrusion detection mechanism.

* * * * *

UNITED STATES PATENT AND TRADEMARK OFFICE
CERTIFICATE OF CORRECTION

| | | |
|---|---|---|
| PATENT NO. | : 7,024,694 B1 | Page 1 of 1 |
| APPLICATION NO. | : 09/593280 | |
| DATED | : April 4, 2006 | |
| INVENTOR(S) | : Ko | |

It is certified that error appears in the above-identified patent and that said Letters Patent is hereby corrected as shown below:

Title page Item (54) Title, replace "INSTRUSION" with --INTRUSION--;

In the Specification:
Column 1, line 2, replace "INSTRUSION" with --INTRUSION--.

Signed and Sealed this
Eighteenth Day of January, 2011

David J. Kappos
*Director of the United States Patent and Trademark Office*